Patented May 9, 1933

1,908,499

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE PREPARATION OF ORGANIC ESTERS OF CELLULOSE

No Drawing.  Application filed September 26, 1929, Serial No. 395,455.

This invention relates to a process for the preparation of organic esters of cellulose and particularly to a new process for the preparation of cellulose acetate.

Cellulose acetate, as usually employed in the arts, is manufactured by treating some cellulosic body in a bath comprising generally acetic anhydride, acetic acid and a suitable catalyst, such as sulfuric acid. Due to the cost particularly of the acetic anhydride in this acetylating bath, the cellulose acetate produced is considerably more expensive than its corresponding inorganic ester,—cellulose nitrate. For this reason, until recently, cellulose acetate has not been extensively employed in the art, cellulose nitrate being used instead, because of the lower cost thereof and not because of any inherently better qualities that the nitrate had over the cellulose acetate.

It has been the object of many investigators in this art, therefore, to provide some substitute for the acetic anhydride or some manner of producing the acetic anhydride which will render its use less expensive. No process to our knowledge has yet been disclosed which will fully eliminate its use. What has been said here, in regard to cellulose acetate, is equally true with the other organic esters of cellulose which are made by action of the anhydride of the organic acid on cellulose.

An object of the present invention is to provide a process for the preparation of organic esters of cellulose in which little or no acetic anhydride is employed. A further object is to produce cellulose esters by the treatment of cellulose with an aryl acid chloride, an organic acid and an organic base. Other objects will hereinafter appear.

It has been known that benzoyl chloride or other aryl acid chlorides in the presence of an aliphatic acid of low molecular weight and an organic base, such as pyridine, will produce an acid chloride of the aliphatic acid. (See Annalen 301, 99—1898.) As esterifying agents of cellulose, the acid chlorides have not generally been commercially employed, due primarily to the fact that they rapidly degrade the cellulose molecule because of the evolution in the esterifying bath of quantities of hydrogen chloride. This degradation of the cellulose molecule renders the resulting cellulose ester of little or no commercial value. It has been found, however, that if pyridine or other organic base of a similar structure is present in a reaction mixture containing the acid chloride of an aliphatic acid, the liberation of hydrogen chloride is sufficiently inhibited, so that the degradation of the cellulose does not occur. This action has been particularly noted in and utilized by the Wohl method for the preparation of the cellulose tribenzoate. See Worden "Technology of Cellulose Esters," vol. III, page 2656.

When the usual acetylating process is employed,—that is, for example, acetic anhydride and acetic acid, the esterification is conducted generally below 50° C. If the temperature is permitted to advance much above this temperature, degradation of the cellulose will result. It has also been known that cellulose may be benzoylated by the use of benzoyl chloride in the presence of pyridine.

We have discovered that cellulose can be acylated, particularly with the lower aliphatic organic acids, by the use of an aryl acid chloride in the presence of the organic acid and an organic base. While the presence of the aryl acid chloride in the esterifying mixture, without doubt, produces the acid chloride of the organic acid used, no appreciable degradation of the cellulose results from this reaction for the reason that the degrading action upon the cellulose of the hydrogen chloride, normally generated in such a reaction, is inhibited by the presence of the organic base. A cellulose ester is produced which is generally less expensive than one produced by the usual process in which an anhydride of the acid is used. Whether or not it be less or more expensive than the usual process for the esterification of cellulose will, of course, be determined by the relative prices of the anhydride and the aryl acid chloride and the organic base.

This process may be used equally well for the preparation of various organic esters of cellulose and particularly the aliphatic organic acid esters, such, for example, as cellulose, propionate, butyrate, etc., and particularly cellulose acetate, which at the present time is of the greatest commercial importance.

While we have found that benzoyl chloride is particularly advantageous for our purpose, other aryl acid chlorides can be used for the acylation of cellulose by the aliphatic acids. As an example, phthalyl chloride will bring about the acetylation of cellulose in the presence of acetic acid and pyridine. Substituted benzoyl chlorides, as para or meta-nitro-benzoyl chloride or para or meta-chlor-benzoyl chloride or substituted phthalyl chlorides will also react to produce cellulose acetylated by the aliphatic acids. Other equivalents of these chlorides may be mentioned, such as the chlorides of toluic acids, terephthalic acids, iso phthalic acid, salicylic acid and like equivalents.

As hereinbefore stated, it is desirable to have pyridine present in the reacting mixture in order that no hydrogen chloride be formed with resulting degradation of the cellulose molecule. Equivalents of this organic base have likewise been found by us to act in much the same manner as pyridine. Examples of these bases having a similar structure to pyridine are quinoline, iso quinoline, pyrrole or similar heterocyclic basic compounds and their substituted derivatives such as quinaldine, etc., or any basic compound containing a heterocyclic ring having more than four carbon atoms and less than three nitrogen atoms.

In conducting our process, we have found it advantageous in many instances to carry out the process in what might be termed two stages. In the first stage, the cellulose, such as cotton linters, are treated with a solution containing the base and the organic acid. The whole is heated to the desired temperature and held for a period of a few hours to allow a thorough penetration of the cellulose by the liquids. Upon cooling to room temperature, the aryl acid chloride is then added and after thorough mixing, allowed to stand until the desired cellulose ester is obtained, the temperature of the final reaction being governed as described below. The product is then precipitated in the usual manner, as, for example, by pouring into water, and later washed to neutrality. The first wash water may contain a small percentage of alkaline salts in order to more rapidly neutralize the acidity of the solution and render the benzoyl chloride more soluble, and finally, a pure water may be used to wash the whole to neutrality.

The use of an organic base, such as pyridine, enables the esterifying reaction to take place, even at elevated temperatures, without substantial degradation of the cellulose molecule. The temperature of the reacting mass, therefore, does not require as thorough a heat control as is necessary when the usual acetylating process is employed. We have found, however, that a temperature of around 50° C., particularly in the case of cellulose acetate, is sufficient to completely acetylate the cellulose in from 24 to 30 hours, which results in a fully acetylated ester.

Another advantage of our process is that the cellulose acetate produced is not only soluble in chloroform, ethylene chloride and chloroform-alcohol, which is usually the case of the triacetyl cellulose, but the cellulose produced by this process is likewise mostly soluble in acetone. It is not necessary, therefore, to hydrolize the cellulose acetate obtained to change the solubility from chloroform to acetone solubility, which is generally required when the usual acetylating process is carried out.

We shall now give several examples describing methods for carrying out our invention, but it shall be distinctly understood that we are not to be limited by the details therein given, except as are indicated in the appended claims.

*Example I.*—10 grams of cotton linters are placed in a container with 5 to 10 parts of pyridine dissolved in 70 parts of glacial acetic acid. The container may be closed and heated to 53° C., for 3½ hours, in order to allow thorough penetration of the cellulose by the liquid. On cooling to room temperature, 20 to 30 parts of benzoyl chloride may be added and the whole thoroughly mixed. The reaction is quite vigorous at this point and when it has subsided, the container is placed in a water bath at a temperature of 45 to 50° C., for a period of 24 to 30 hours. Upon precipitation by pouring into water and washing to neutrality with dilute sodium bicarbonate solution and finally pure water, a cellulose acetate is produced containing 37.9% acetyl, with a melting point of 300° + C. A solution of this ester in 75% chloroform-alcohol when measured in the ordinary polariscope gives a specific rotation of $-80°$ using the green line of a mercury vapor lamp (546.1 mu).

This cellulose acetate is soluble in chloroform, ethylene chloride, chloroform-alcohol and mostly soluble in acetone. This material differs from the cellulose acetate prepared by the ordinary methods of acetylation in that it is soluble in ethylene chloride and likewise in acetone.

*Example II.*—10 grams of cotton linters are placed in a suitable container with a mixture of 3 to 10 parts of pyridine and 70 parts of glacial acetic acid and heated for 2 hours at a temperature of approximately 50° C. On cooling to room temperature, 15 to 25 parts of phthalyl chloride may be stirred in. The heat of the reaction increases considerably and after reaching equilibrium, the mass is maintained at a temperature of 40° C., for 24 hours, when the esterification is complete. The product is washed and neutralized, as in the preceding example. This cellulose ester is found to be soluble in the same solvents and in about the same proportions of the solvents as the ester prepared as described in the previous example.

In the process as here described, it is not impossible that some benzoylation or arylation may take place, simultaneously with the acylation of the cellulose. Therefore, in description of or claims to this process, it will be understood that this side reaction may or may not be present. We have not been able, however, to detect any appreciable amounts of benzoylation by the methods of analysis which are at present known. We, therefore, feel that, at the most, only a very slight arylation occurs.

It is evident from a study of our process that it may be used to esterify cellulose with any of the aliphatic organic acids and particularly with acetic acid in the presence of an aryl acid chloride and an organic acid or their known equivalents in the presence of a suitable organic base without in any way departing from our invention, or sacrificing any of the advantages that may be derived therefrom.

What we claim as new and what we desire to be secured by Letters Patent in the United States is:

1. A process for the preparation of organic esters of cellulose which comprises acylating cellulose in a bath containing an aryl acid chloride, an aliphatic carboxylic acid and a compound containing a heterocyclic ring having more than four carbon atoms and less than three nitrogen heterocyclic groups.

2. A process for the preparation of organic esters of cellulose which comprises acetylating cellulose in the presence of an aryl acid chloride, acetic acid and a compound containing a heterocyclic ring having more than four carbon atoms and less than three nitrogen heterocyclic groups.

3. A process for the preparation of organic esters of cellulose which comprises esterfying cellulose in the presence of a substituted benzoyl chloride, an aliphatic carboxylic acid and a compound containing a heterocyclic ring having more than four carbon atoms and less than three nitrogen heterocyclic groups.

4. A process for the preparation of organic esters of cellulose which comprises esterifying cellulose in the presence of para-chlor-benzoyl chloride and pyridine.

5. A process for the preparation of organic esters of cellulose which comprises acylating cellulose in the presence of a substituted aryl acid chloride, an aliphatic carboxylic acid and a compound containing a heterocyclic ring having more than four carbon atoms and less three nitrogen heterocyclic groups.

6. A process for the preparation of organic esters of cellulose which comprises acylating cellulose in the presence of benzoyl chloride, an aliphatic carboxylic organic acid and pyridine.

7. A process for the preparation of organic esters of cellulose which comprises acetylating cellulose in the presence of a substituted aryl acid chloride, acetic acid and a compound containing a heterocyclic ring having more than four carbon atoms and less than three nitrogen heterocyclic groups.

8. A process for the preparation of organic esters of cellulose which comprises acetylating cellulose in the presence of benzoyl chloride, acetic acid and pyridine.

9. A process for the preparation of organic esters of cellulose which comprises acetylating cellulose in the presence of a substituted benzoyl chloride, acetic acid and a compound containing a heterocyclic ring having more than four carbon atoms and less than three nitrogen heterocyclic groups.

10. A process for the preparation of organic esters of cellulose which comprises acetylating cellulose in the presence of para-chlor-benzoyl chloride, acetic acid and pyridine.

11. A process for the preparation of organic esters of cellulose which comprises treating cellulose in a solution of pyridine and acetic acid, subsequently adding thereto benzoyl chloride and continuing the reaction until the desired cellulose acetate is obtained.

12. A process for the direct preparation of acetone-soluble cellulose acetate which comprises treating cellulose in an esterifying bath containing benzoyl chloride, acetic acid and pyridine.

13. A process for the preparation of organic esters of cellulose which comprises esterifying cellulose in the presence of an aryl acid chloride, an aliphatic carboxylic acid and an organic heterocyclic basic compound containing nitrogen in the heterocyclic ring.

14. A process for the preparation of organic esters of cellulose which comprises esterifying cellulose in the presence of an aryl acid chloride, a fatty acid and an organic heterocyclic basic compound containing nitrogen in the heterocyclic ring.

15. A process for the preparation of organic esters of cellulose which comprises esterifying cellulose with a substituted aryl acid chloride, an aliphatic carboxylic acid and an organic base selected from the group consisting of the pyridine series, the benzo-pyridine or quinoline series and the pyrrole series of compounds.

16. A process for the preparation of organic esters of cellulose which comprises esterifying cellulose with a substituted aryl acid, chloride, a fatty acid and an organic base selected from the group consisting of the pyridine series, the benzopyridine or quinoline series and the pyrrole series of compounds.

17. A process for the preparation of organic esters of cellulose which comprises esterifying cellulose with a substituted aryl acid chloride, acetic acid and an organic base selected from the group consisting of the pyridine series, the benzopyridine or quinoline series and the pyrrole series of compounds.

Signed at Rochester, New York, this 21st day of September, 1929.

CHARLES S. WEBBER.
CYRIL J. STAUD.